July 1, 1930.                I. I. NELSON                 1,768,778
                          FUSIBLE PLUG HOLDER
                          Filed Sept. 25, 1928

Inventor:
Ira I. Nelson.
By Charles S. Gooding,
      Atty.

Patented July 1, 1930

1,768,778

UNITED STATES PATENT OFFICE

IRA I. NELSON, OF BOSTON, MASSACHUSETTS

FUSIBLE-PLUG HOLDER

Application filed September 25, 1928. Serial No. 308,331.

This invention relates to an improved fusible plug holder.

The object of the invention is to provide a holder for a fusible plug which can be readily installed in a boiler such as the body portion of a range boiler and which, when the fusible plug in the holder melts, can be replaced without removing the fusible plug holder as a whole from the boiler and without disconnecting any of the piping.

The invention consists in a fusible plug holder constructed as hereinafter set forth and particularly as pointed out in the claims.

Referring to the drawings.

Like numerals refer to like parts in the several views of the drawings.

Figure 1:
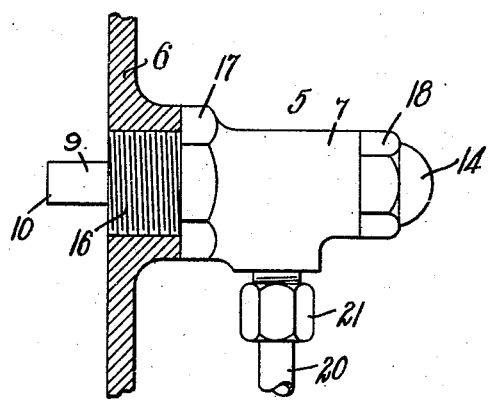
Figure 1 is a side elevation of my improved fusible plug holder showing the same attached to a portion of a range boiler, said portion being shown in section.

In the drawings, 5 is the fusible plug holder and 6 a portion of a range boiler, to which the fusible plug holder is attached.

Figure 2:
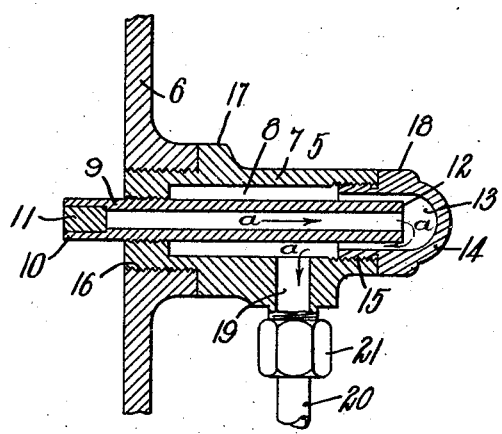
Fig. 2 is a longitudinal sectional elevation taken on the line 2—2 of Fig. 3.

The fusible plug holder as a whole consists of a casing 7 which is provided with an interior chamber 8 and is closed at the left hand end, Fig. 2, by a tubular holder 9 which has screw-threaded engagement with the casing 7. The tubular holder 9 projects through the chamber 8 and out of the opposite ends thereof, the ends thereof having a fusible plug 11 inserted therein and the end 12 projecting beyond the casing 7 and into the interior 13 of a cap 14 which has screw-threaded engagement exteriorly thereof with an interior screw thread 15 provided in one end of the casing 7. The opposite end of said casing is also screw-threaded at 16 to engage the wall of the boiler 6.

Figure 3:
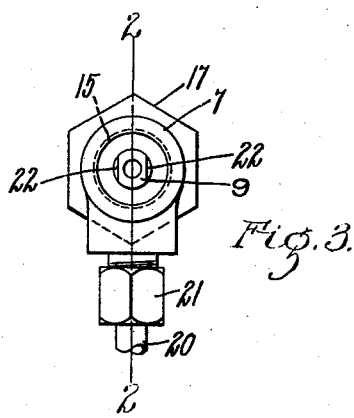
Fig. 3 is an end elevation viewed from the right of Fig. 1.

It will be seen that the cap 14 is spaced apart from the end 12 of the tubular holder and also from the periphery of said tubular holder and that opposite sides of the tubular holder 9 are flattened at 22, Fig. 3, so that when it is desired to insert the tubular holder in the casing or remove it therefrom it can be done by means of a wrench.

The casing 7 has a hexagonal flange 17 thereon adjacent the screw-threaded portion 16, so that the casing can be screwed firmly into the body portion of the range boiler 6. The cap 14 also has a hexagonal flange 18 thereon, whereby the cap may be firmly screwed into the casing 7. The casing 7 is provided with an outlet orifice 19 which extends out of one side of the chamber 8 and is in alignment with a pipe 20 which is secured to the casing 7 by a nut 21.

The general operation of the device is as follows: Assuming the parts to be positioned as illustrated in Figs. 1 and 2, the projecting end 10 of the tube then projects into the interior of the boiler 6 and into the hot water therein; when the temperature of the water exceeds the melting point of the fusible plug 11, the said plug will melt and the water will pass through the tubular holder 9 in the direction of the arrows $a$ and outwardly through the orifice 19 and pipe 20. A new holder and plug can now be inserted by removing the cap 14, then removing the tubular holder 9 by unscrewing the same from the casing 7, applying the wrench to the flattened portions 22 of the projecting righ hand end of the tubular holder 9 as viewed in Fig. 2, and a new holder can then be inserted by screwing the same into the casing 7 as shown in Fig. 2. The cap 14 is then screwed on to the casing 7 and the device is ready for use. The said operation of replacing the fusible plug, it will be noted, does not necessitate disturbing the casing 7 of the fusible plug holder nor does it necessitate disconnecting the pipe 20 from the casing 7.

I claim :

1. A fusible plug holder having, in combination, a hollow casing provided with an outlet orifice, a tubular holder extending longitudinally through said casing and fast at one end to said casing, a fusible plug in one end of said tubular holder, and a cap fast to said casing and covering the opposite end of said tubular holder, from which it is spaced apart.

2. A fusible plug holder having, in combination, a hollow casing provided with an outlet orifice, a tubular holder extending longitudinally through said casing and fast at one end to said casing, one end thereof projecting outwardly beyond said casing, a fusible plug in said projecting end, and a cap fast to said casing and covering the opposite end of said tubular holder, from which it is spaced apart.

3. A fusible plug holder having, in combination, a casing provided with a chamber therein and an outlet orifice leading out of said chamber, a tubular holder fast at one end to said casing extending through said chamber and closing one end thereof, a fusible plug in the end of said tubular holder which closes one end of said chamber, and a cap fast to said casing closing the other end of said chamber and covering an open end of said tubular holder, from which it is spaced apart.

4. A fusible plug holder having, in combination, a hollow casing provided with an outlet orifice, a tubular holder extending longitudinally through said casing and fast at one end to said casing, a fusible plug in one end of said tubular holder, the opposite end of said tubular holder being exteriorly flattened, and a cap fast to said casing and covering the flattened end of said tubular holder, from which it is spaced apart.

5. A fusible plug holder having, in combination, a casing provided with a chamber therein and an outlet orifice leading out of said chamber, a tubular holder fast at one end to said casing extending through said chamber and closing one end thereof and projecting at its opposite ends beyond said casing, a fusible plug in the end of said tubular holder which closes one end of said chamber, and a cap fast to said casing closing the other end of said chamber and covering an open end of said tubular holder, from which it is spaced apart.

6. A fusible plug holder having, in combination, a casing provided with a chamber therein and an outlet orifice leading out of said chamber, a tubular holder fast at one end to said casing extending through said chamber and closing one end thereof and projecting at its opposite ends beyond said casing, a fusible plug in the end of said tubular holder which closes one end of said chamber, and a cap fast to said casing closing the other end of said chamber and covering an open end of said tubular holder, from which it is spaced apart, said casing being exteriorly screw threaded adjacent the end of said tubular holder which contains the fusible plug and interiorly screw threaded adjacent the opposite end of said tubular holder to engage an exteriorly screw-threaded portion of said cap.

7. A fusible plug holder having, in combination, a hollow casing provided with an outlet orifice on one side thereof, one end of said casing being closed and terminating in an exteriorly threaded portion adapted to engage a boiler wall, a tubular holder extending longitudinally through said casing and one end thereof projecting through the closed end of said casing to which it is fastened, a fusible plug in said projecting end of said tubular holder, and a cap fast to said casing and covering the opposite end of said tubular holder, from which it is spaced apart.

In testimony whereof I have hereunto set my hand.

IRA I. NELSON.